United States Patent [19]

Borzym

[11] Patent Number: 4,909,110

[45] Date of Patent: Mar. 20, 1990

[54] TUBE CLAMPING APPARATUS

[76] Inventor: John J. Borzym, 4820 School Bell La., Birmingham, Mich. 48010

[21] Appl. No.: 149,429

[22] Filed: Jan. 29, 1988

[51] Int. Cl.$^4$ .............................................. B23D 25/04
[52] U.S. Cl. ........................................ 83/319; 269/89; 269/130; 83/698; 83/374; 83/375; 83/269
[58] Field of Search .................... 83/54, 382, 269, 375, 83/374, 698, 319; 269/89, 130, 190, 196, 284, 283

[56] References Cited

U.S. PATENT DOCUMENTS

| | | | |
|---|---|---|---|
| 2,563,467 | 8/1951 | Hartmann | 269/196 |
| 3,855,738 | 12/1974 | Guggenheim, Sr. et al. | 269/196 |
| 4,392,644 | 7/1983 | Borzym | 83/319 |

Primary Examiner—Frank T. Yost
Assistant Examiner—Tom Hamill, Jr.
Attorney, Agent, or Firm—Dykema Gossett

[57] ABSTRACT

A tube cutting apparatus of the type in which jaws carried by relatively reciprocal slides move into and out of clamping engagement with tubing to facilitate severing of lengths of tubing as the tubing is moving rapidly along its lengthwise axis. Each of the jaws is releasably secured to the respective slide by a cam pin which co-acts with a cam surface on the jaw to bring an eccentric portion of the cam pin into wedging coaction with the cam surface on the jaw in response to rotation of the pin and firmly and wedgingly secure the jaw to the slide. The jaw may be removed from the slide by simply rotating the cam pin a fraction of a revolution, axially withdrawing the cam pin, and then lifting the jaw out of the slide. Replacement is accomplished by reversing this procedure.

20 Claims, 3 Drawing Sheets

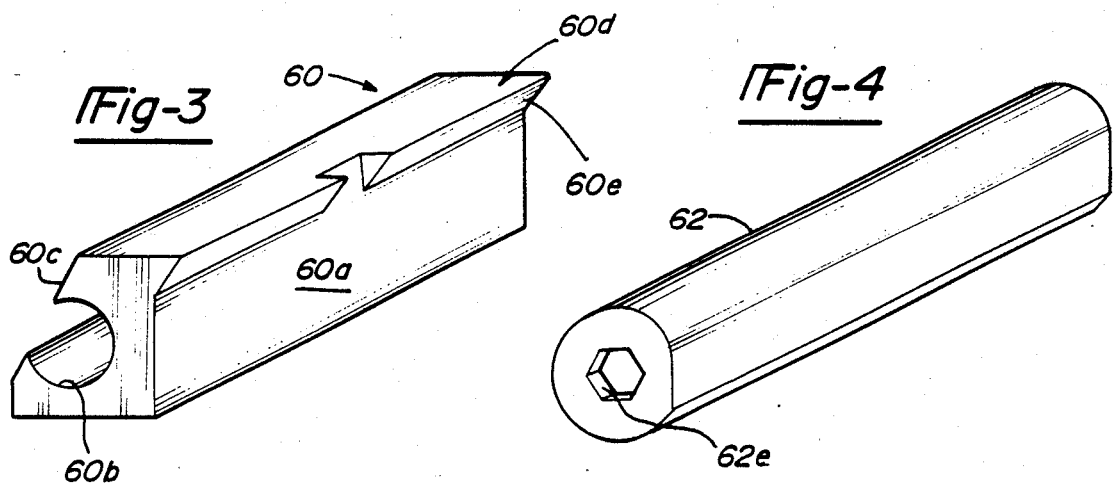
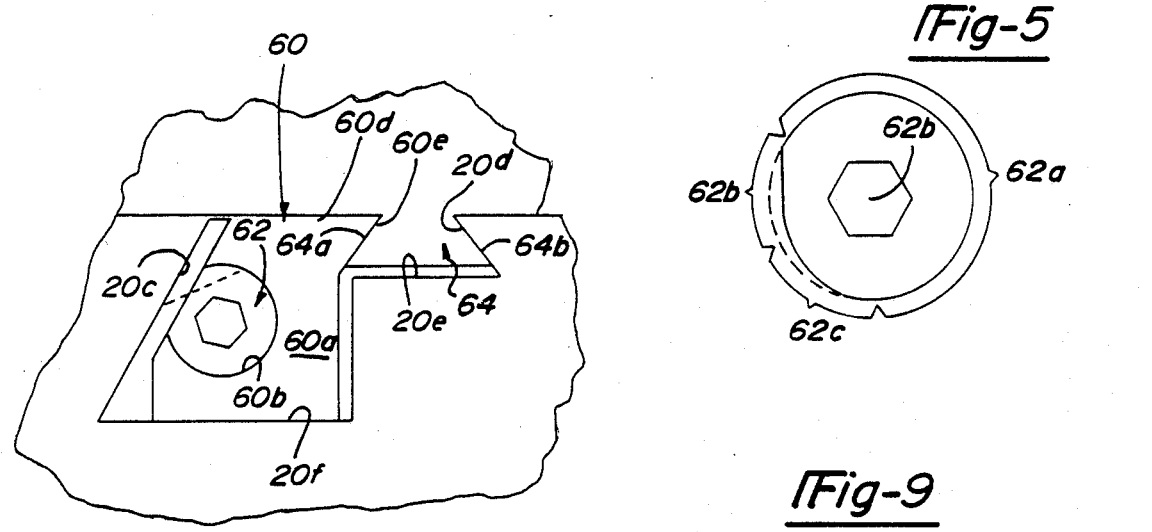
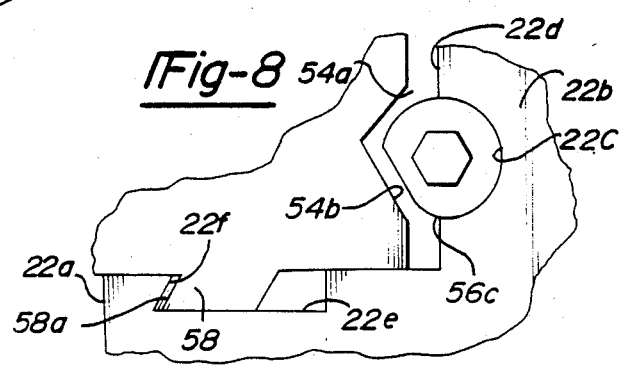

TUBE CLAMPING APPARATUS

FIELD OF THE INVENTION

This invention relates to cutting apparatus of the type employed to sever sections of stock such as tubing and particularly to an improved apparatus by which stock-clamping members, hereinafter called "jaws," are precisely located and held in place in the cutting apparatus. The present invention is particularly well suited for use in cut-off die sets driven by presses and located at the terminal ends of high-speed, high-production mills where stock is cut on the fly. However, the invention is not limited in use to such applications.

BACKGROUND OF THE INVENTION

Cutting apparatus of the type generally described above is well known in the tube-making art as is exemplified by U.S. Pat. Nos. 3,938,415, 4,108,029 and 4,294,147 owned by the assignee of the present invention, the entire disclosures of which patents are hereby incorporated by reference herein. While the prior art machines disclosed in these patents are both highly efficient and are well suited for their intended purpose, certain aspects thereof are nevertheless subject to improvement.

The above-mentioned patents disclose tube cutting apparatus which, in principal part, comprises a die set which operates with, but is removable as a unit from, a press. The die set comprises reciprocally movable upper and lower platen assemblies, a set of two holder members, usually slides, mounted on the lower platen assembly, and two sets of stock-clamping jaws mounted by bolts on the holders. The jaws are configured to conform to and hold the stock when closed thereon, for the purpose of preventing movement between the stock and the die set components during the cut. The die set further comprises either one or two blades, each of which must pass between the jaw sets during movement of the platen assemblies. A mechanism is provided for closing and opening the jaws in timed relationship to the reciprocal movement of the platen assemblies and blades.

It is essential in this arrangement that the jaws be precisely located on the holders so that the stock is firmly held and the blades pass between the spaced-apart side faces of the jaws with just the right clearance. Proper location and alignment in prior art die sets is somewhat laboriously achieved during a "set-up" operation, using spacers and appropriate tools. Changing die sets, for example to accommodate stock of a different size, or to replace worn jaws, results in lost production time and, therefore, in preferably accomplished in the least possible time, but without losing the required accuracy.

The difficulty encountered in the set-up operation is due not only to the need for precise location, but also to the need to handle machine bolts which secure the jaws to the holders. These bolts have a way of becoming dirty, damaged and even lost, if only temporarily. the conscientious worker carefully handles these bolts, cleans them as necessary, and turns them to just the right degree of tension to hold the jaws in the proper location; all requiring time and "feel" which comes only from experience.

SUMMARY OF THE INVENTION

The present invention has for its principal objectives a simplification of the procedure for accurately installing stock-clamping jaws on associated slide members, a reduction in the need for spacers to provide positive location references, and the elimination of the need to handle or even use certain bolts as part of the jaw-securement procedure.

In general, these objectives are accomplished by providing mating locator surfaces on the jaws and associated holders which, when a zero clearance relationship is realized, partially secure the jaws to the holder and positively achieve proper location of the jaws relative to the stock. The objectives are further realized by providing a mechanism such as a cam-lock which either directly or indirectly urges the mating surfaces together to partially secure the jaws to the holders. The worker may, therefore, install each of two opposing jaw sets, pre-spaced for blade clearance, onto their respective holders, simply by placing the mating locator surfaces in contact with one another, and turning a pin or screw to operate the cam-lock. Since the locator surfaces position the jaws only transverse to the longitudinal stock axis, the faces of the jaws may be reground as necessary without affecting the clamping accuracy.

As hereinafter described, an illustrative embodiment of the invention comprises jaw slides or "holders," mounted for movement relative to each other in a direction generally transverse to the lengthwise axis of the associated workpiece, and first and second die jaw sets mounted respectively on the first and second die jaw holders. According to the invention, coacting dovetail locator surfaces are provided on the holder members and on the jaw members which are operative to releasably secure the die jaw members to the respective holder members. This arrangement allows the jaws to be readily removed from holder by simply releasing the wedging engagement as between the jaws and the holders, whereafter new or reground jaws may be secured to the holders by simply reestablishing the wedging interaction between the jaws and the holders. Although "dovetail" surfaces are disclosed herein, there are a variety of mating configurations which can be used.

According to an illustrative and specific embodiment of the invention, for each jaw member and respective holder member, the cam-locking wedge means comprises an eccentric member mounted for coaction with a cam face on one of the members. This simple arrangement allows an inexpensive and effective means of securing the jaws to the holder members.

Further according to the illustrative embodiment of the invention, each of the eccentric members comprises a pin member mounted for rotation about an axis parallel to the lengthwise axis of the workpiece and having a circumferential wedging surface thereon eccentric with respect to the rotational axis of the pin member and wedgingly engaging the cam face on the associated jaw or holder member. With this arrangement, the jaws may be secured to the holder and removed from the holder by a simple rotational movement of the pin member.

According to a preferred embodiment of the invention, each of the holder members includes a horizontal mounting surface, each of the jaw members is mounted on the mounting surface of the associated holder member for movement on the holder member mounting surface in a direction transverse to the lengthwise workpiece axis, and each jaw member is moved in a transverse direction relative to the associated holder member upon rotation of the associated pin member. This specific mounting arrangement with respect to the jaws and holders allows the jaws to move smoothly and effectively into locking interengagement with the respective holder members upon a simple rotation of the associated pin members.

According to a preferred embodiment of the invention, each jaw member further includes a lock face extending parallel to the lengthwise workpiece axis and skewed with respect to the direction of transverse movement of the jaw members, and each holder member includes a lock face extending parallel to and in confronting relation to the lock face on the associated jaw member for interlocking coaction therewith upon movement of the jaw member in a transverse direction upon rotation of the associated pin member. This arrangement produces firm interlocking engagement of the jaw members with the holder members in response to a simple rotational movement of the associated pin.

According to a preferred embodiment of the invention, an axial groove is provided in the mounting surface of each holder member, each jaw member includes an axial rib along its lower face positioned in a respective groove, the lock face on each jaw member is defined along an axial edge of the axial rib thereof, and the lock face on each holder member is defined along an axial edge of the axial groove therein. This arrangement moves the lock face on the jaw member into interlocking engagement with the lock face on the holder member in response to rotational movement of the associated pin member.

According to a preferred embodiment of the invention, one of the holder members includes an inboard platform portion defining the horizontal mounting surface on the top face thereof and an outboard tower portion defining a side face extending upwardly from the outboard end of the platform portion; the jaw member mounted on the mounting surface of the holder member defines an outboard face positioned in confronting, transversely spaced relation to the side face of the holder member tower portion; a cam face is defined on the outboard face of the jaw member; and the respective pin member is positioned between the jaw member outboard face and the holder member side face with the wedging surface of the pin member wedgingly engaging the cam face on the jaw member so as to urge the jaw member transversely inboard in response to rotation of the pin member.

According to a preferred embodiment of the invention, an axially extending inboard opening journal surface is provided in the side face of the one holder member and the pin member is journalled in this journal surface. This arrangement provides a simple and convenient means for mounting the pin member and for moving the jaw member transversely in response to rotation of the pin member.

According to the preferred embodiment of the invention, one of the holder members includes an axial groove opening in the mounting surface thereof; the jaw member mounted on this holder member includes an axially extending rib defining the jaw member lock face along the outboard axial edge thereof; an axially extending clamp member is positioned in the axial groove of the holder member and includes an axially extending lock face along its upper inboard edge and an axially extending journal surface opening adjacent the outboard edge surface of the groove; the outboard edge surface of the groove defines a cam surface; and the respective pin member is journalled in the journal surface of the clamp member with its circumferential wedging surface wedgingly engaging the cam surface defined by the outboard edge surface of the groove to urge the clamp member inboard in response to rotation of the pin member and move the clamp member lock face into locking engagement with the jaw member lock face.

According to the preferred embodiment of the invention, the rib has a dovetail configuration and defines a further lock face along the inboard axial edge thereof; the one holder member defines a further axially extending lock face proximate the inboard end of the mounting surface; and the outboard lock face on the rib is moved into locking engagement with the further lock face on the holder member in response to rotation of the pin member. The two pairs of lock faces defined respectively by a lock face on the clamp and a lock face on the dovetail and by another lock face on the dovetail and a lock face on the holder member coact to firmly lock the jaw member in position on the holder member in response to rotation of the pin member.

BRIEF DESCRIPTION OF THE DRAWINGS

FIG. 3 is a perspective view of a clamp member employed in the invention tube clamping apparatus;

FIG. 4 is a pespective view of a pin member for coaction with the clamp member of FIG. 3;

FIG. 5 is an end view of the pin member of FIG. 4;

FIG. 6 is a fragmentary view showing the manner in which the pin member coacts with the clamp member to secure the jaw to the associated holder member;

FIG. 7 is a perspective view of a further pin member for use in the invention cutting apparatus;

FIG. 8 is a fragmentary end view showing the manner in which the pin member of FIG. 7 coacts to lockingly secure a jaw member to the associated holder member; and FIG. 9 is an end view of the pin member of FIG. 7.

DETAILED DESCRIPTION OF THE PREFERRED EMBODIMENT

Figure 1:
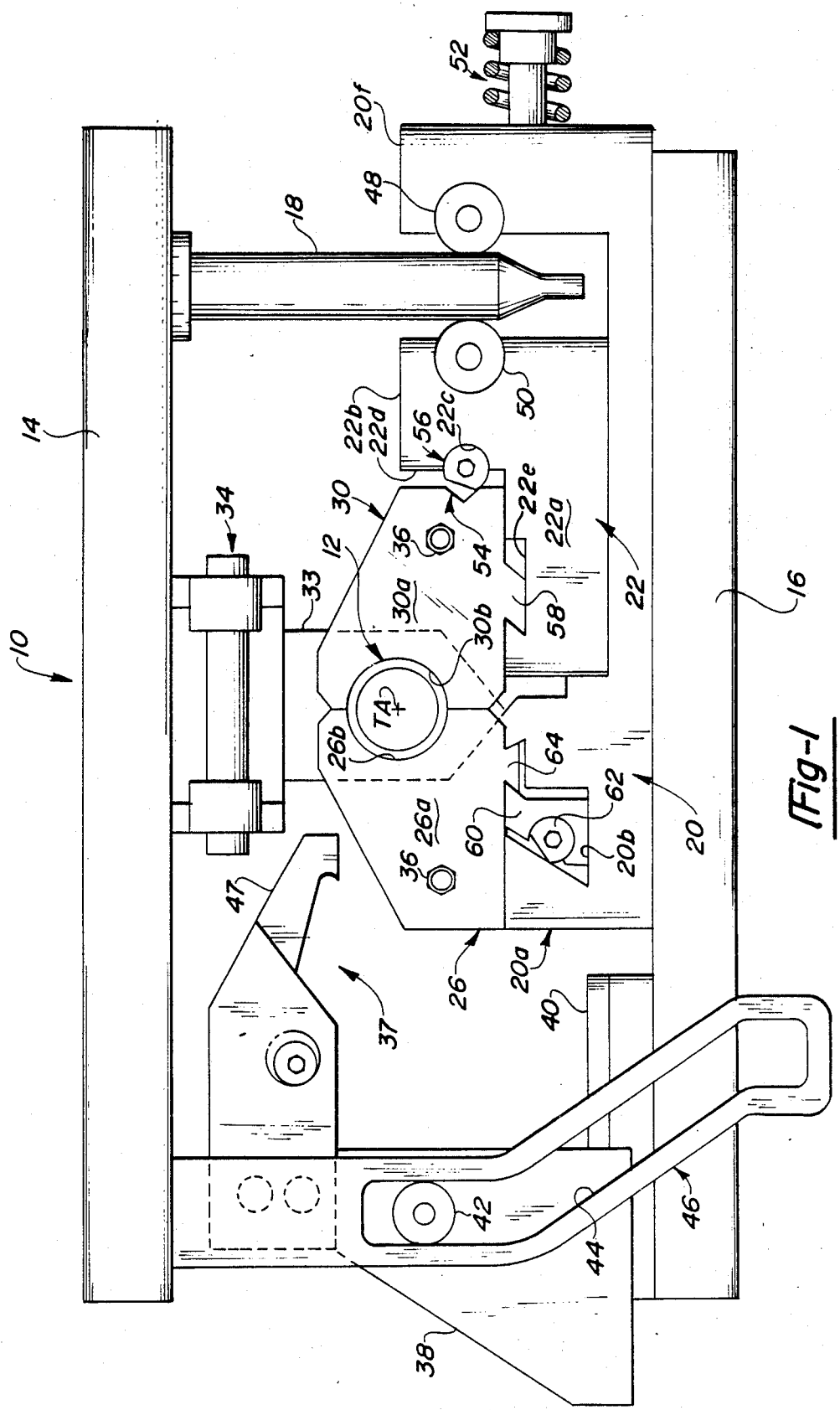
FIG. 1 is an elevational somewhat diagrammatic view of a tube clamping apparatus embodying the invention.
Figure 2:
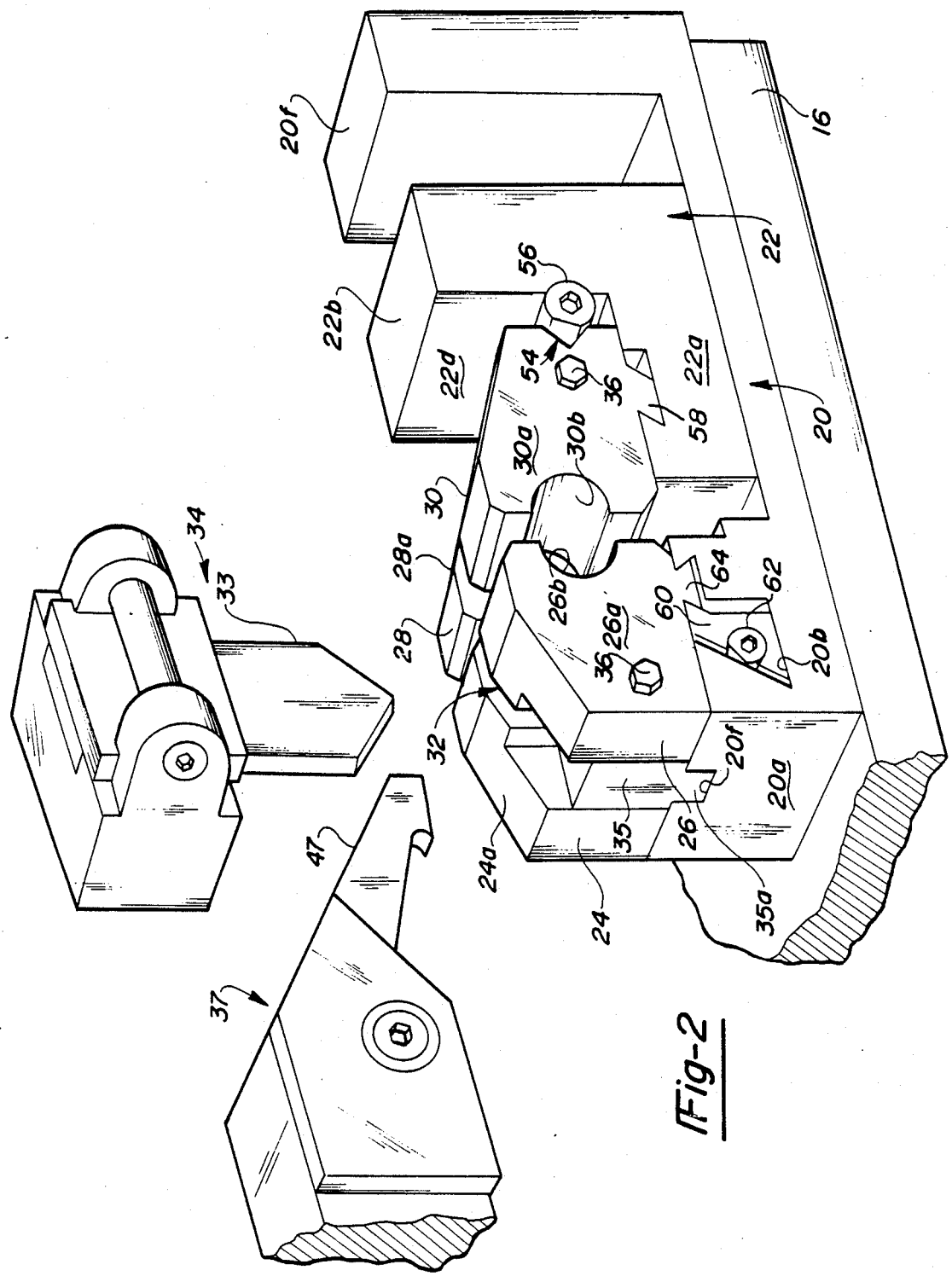
FIG. 2 is a fragmentary perspective view of a portion of the apparatus of FIG. 1.

The improved tube clamping apparatus of the present invention is intended for use with a die set generally designated by the numeral 10. Die set 10 is adapted to be mounted within a die press or the like (not shown) for slidable movement along a rail set (not shown) within the press. The press normally includes a swinging or orbiting type ram mechanism which serves to drive the die set 10. Die sets of this type operate by the ram mechanism first causing clamping of the rapidly moving length of welded steel tubing 12, with the cut-off apparatus being positioned to receive the elongated tubing stock as the letter emanates along its own axis TA from a source (not shown) thereof, such as a fabrication mill. The die set 10, clamped to the moving tube 12, moves with the latter along the rail set while the ram mechanism drives a main guillotine-type severing blade in a reciprocating fashion to shear a slug from the tubing 12 and thereby sever a length of the tubing. The cut-off operation as described above is normally preceded by a notching operation wherein a notching blade is driven through a portion of the periphery of the tubing 12 in the plane of the severing blade in order to cut a notch in the periphery of the tubing 12 to facilitate a clean cut by the severing blade. The ram mechanism is then raised to retract the severing blade and unclamp the die set 10 from the tubing 12. A separate mechanism called an "accelerator" then returns the die set on the rail set to its starting position, ready for the initiation of a new cut-off cycle. The die set 10 is not limited in use to tubing or even round stock; however, the stock-conforming surfaces of the clamping jaws must be altered to fit the stock.

Die set 10 includes an upper shoe 14, a lower shoe or base 16, and a wedge-type cam 18 which is secured to upper shoe 14 and depends downwardly therefrom.

First and second holder members in the form of lower and upper slide members 20 and 22 are slidably mounted on base 16 for horizontal reciprocating movement relative to each other upon operation of the ram mechanism. A first set of jaw members 24 and 26 are mounted in axially spaced relation on a horizontal mounting surface defined by the top face of a platform portion 20a of slide member 20, and a second pair of jaw members 28 and 30 are mounted in axially spaced relation on a horizontal mounting surface defined by the top face of a platform portion 22a of slide member 22. Jaw members 24, 26, 28 and 30 each include a main body portion 24a, 26a, 28a, 30a and each define an arcuate clamping surface (only clamping surfaces 26b and 30b are shown) contoured to conform to the exterior shape of the tubing 12. A gap or slot 32 is defined between axially spaced jaws 24, 26 and axially spaced jaws 28, 30 for passage of the blade 33 of a guillotine or severing blade assembly 34 to sever a length of tubing 12 clamped between jaws 24, 26, 28 and 30.

Jaw members 24 and 26 are mounted in axially spaced relation on platform portion 20a of slide member 20 by a spacer 35 positioned between the jaw members. Spacer 35 is received in notches 24c and 26c in jaw members 24 and 26 and includes a lower rib portion 35a received in a groove 20f in platform portion 20a of slide member 20. A similar spacer is positioned between jaws 28 and 30. A bolt 36 extends through aligned axial bores in jaw member 26, spacer 35, and jaw member 24 for coaction with a nut to clamp jaw members 24 and 26 to spacer 35. Another bolt 36 similarly clamps jaw members 28 and 30 to the spacer member 35 positioned therebetween.

Further details of guillotine blade assembly 34 are disclosed in applicant's co-pending patent application Ser. No. 149,837, filed on the same date as the present application and assigned to the assignee of the present application.

A slotting or scarfing blade assembly 37 is secured to a cross slide 38 which in turn is mounted for horizontal reciprocation in a direction perpendicular to the axis TA of tubing 12 by means of a slide rail 40 mounted on base member 16. A cam roller 42 is mounted on cross slide 38 and is confined for movement on the inside track 44 of a curve cam 46 which extends downwardly from upper shoe 14 so that vertical movement of upper shoe 14 relative to base 16 moves cam 46 vertically relative to cam roller 42 to thereby move the scarfing blade 47 of scarfing blade assembly 36 transversely with respect to the path of the tubing to accomplish the notching operation preparatory to the severing operation of guillotine assembly 34. Further details of scarfing blade assembly 37 are disclosed in applicant's co-pending application Ser. No. 749,387.

Slide members 20 and 22 are caused to move toward and away from each other and transverse to axis TA by the action of wedge cam 18 coacting with cam rollers 48 and 50 carried respectively on tower portions 20f, 22b of slides 20 and 22 so that upward and downward movement of wedge cam 18 in response to upward and downward movement of upper shoe 14 produces opening and closing movement of slide members 20 and 22 relative to each other in coaction with a spring assembly seen generally at 52. Further details of a wedge and cam roller construction of the type seen schematically in FIG. 1 are disclosed in U.S. Pat. No. 4,294,147 assigned to the assignee of the present application.

The present invention specifically concerns the manner in which clamping jaws 24, 26, 28 and 30 are removed from and secured to the respective slide members.

With respect to jaws 28 and 30, each of these jaws includes an axially extending cut-out 54 at the rear or outboard face of the jaw formed by converging surfaces 54a and 54b. A semi-circular journal surface 22c is formed in the upstanding inboard face 22d of tower portion 22b of upper slide member 22 and extends for the entire axial length of the slide member. A cam pin 56, best seen in FIGS. 7, 8 and 9, is journalled in semi-circular bore 22c. Pin 56, in transverse cross section, includes a circular portion 56a centered on the center 56b of the pin, an eccentric portion 56c of descreasing radius with respect to the center 56b, and a flat or chordal portion 56d. Pin 56 has an axial length generally corresponding to the axial length of upper slide member 22 and, as best seen in FIG. 8, is journalled in journal 22c for camming coaction with surface 54b of cut-out 54. Specifically, pin 56 may be turned by insertion of a suitable wrench into a socket 56e in the end of the pin. As the pin is rotated clockwise, as seen in FIG. 8, in journal 22c, eccentric portion 56c is brought into wedging coaction with cam surface 54b to wedgingly urge the shoe transversely to the left with respect to slide 20. The wedgingly engaged position of the pin with cam surface 54b is seen in dotted lines in FIG. 8. As the jaw is urged transversely on the slide, an axially extending rib 58 formed integrally with the lower face of the jaw slides transversely in a groove 22e in the upper face of platform portion 22a of the slide. As the jaw moves transversely outboard in groove 22e, to the left as viewed in FIG. 8, a skewed or angled lock surface 58a, defined by the outboard edge of rib 58, moves into interlocking engagement with an undercut, skewed lock surface 22f, defined by the inboard axial edge of slot 22e, to securely lock the jaw to the slide.

In summary, the holder 22 provides a horizontal support surface to receive rib 58 and a locator surface adjacent and angularly intersecting the horizontal support surface to form the dovetail relationship with rib 58. These surfaces both secure the jaws 28 and 30 to the holder and locate the jaws in the precise position relative to axis TA.

When it is desired to remove the jaw for regrinding or replacement, pin 56 is rotated counterclockwise to its release position as seen in solid lines in FIG. 8, the pin is removed from the slide by pulling the pin axially out of the slide, the jaw is slid to the right as seen in FIG. 8 to clear interlocking surfaces 58a and 22f, and the jaw is lifted upwardly out of the slide for regrinding or replacement. To replace the reground or replaced jaw, the jaw is reinserted on the slide with rib 58 positioned in groove 22e, pin 56 is axially inserted into journal 22c, and pin 56 is rotated clockwise to bring camming surface 56c into wedging engagement with cam surface 54b and move the jaw into locking interengagement with the slide at surfaces 58a, 22f.

As seen in FIGS. 3, 4, 5 and 6, jaws 24 and 26 are releasably secured to platform portion 20a of lower slide 20 by the use of an elongated clamp 60 and a cam pin 62. Clamp 60 and pin 62 each have an axial length generally corresponding to the axial length of lower slide 20. Clamp 60 includes a main body portion 60a, a journal portion 60b defined along an angled inboard axial face 60c of the clamp, and a locking wedge portion 60d defined adjacent the upper inboard edge of the clamp. Clamp 60 is positioned in an axial groove or slot 20b provided in platform portion 20a of lower slide 20 with wedge portion 60d positioned for locking coaction with a lock surface 64a defined by the outboard axial edge of a dovetail rib 64 provided on the underside of each of jaws 24 and 26.

Cam pin 62 is generally similar to cam pin 56 and includes a circular portion 62a centered on the center 62b of the pin, an eccentric portion 62c of decreasing radius with respect to the center of the pin, and a flat or chordal portion 62d. As best seen in FIG. 6, pin 62 is positioned in clamp 60 with circular surface 62a journalled in journal 60b. When the pin is rotated clockwise in the clamp by the use of a suitable tool inserted into socket 62e, eccentric surface 62c is selectively brought to bear against an undercut cam surface 20c defining the outboard edge of groove 20b. As the eccentric surface 62c is brought into wedging engagement with cam surface 20c, as seen in dotted lines in FIG. 6, clamp 60 is urged inboard or to the right to drive wedge portion 60d into the interlocking engagement with dovetail 64 and, specifically, to bring the lock face defined by the undersurface 60e of wedge portion 60d into locking coaction with lock face 64a of dovetail rib 64 and drive a further lock surface 64b defined by the inboard axial edge of rib 64 into locking coaction with an undercut lock surface 20d constituting the inboard axial edge of a groove 20e provided in the lower slide and communicating at its outboard edge with the inboard edge of groove 20b. Jaws 24 and 26 are thus positively secured to the upper slide 20.

As was the case with holder 22 and jaws 28 and 30, holder 20 provides both support seat and locator surfaces for the jaws 24 and 26, the locator surfaces forming the dovetail with tongue 64 and being aligned with the axis TA.

To remove jaws 24, 26 for replacement or regrinding, cam pin 62 is rotated counterclockwise to its release position, as seen in solid lines in FIG. 6; the cam pin and clamp subassembly 60, 62 is axially withdrawn from the lower slide member; jaws 24 and 26 are moved outboard or to the left as viewed in FIG. 6 to clear lock surfaces 20d, 64b; and the jaws are thereafter removed by upward movement relative to the slide member. To replace the reground or replaced jaws, the new or reground jaws are positioned on top of the slide member with dovetails 64 positioned in groove 20e, the jaws are moved to the right or inboard as viewed in FIG. 6 to bring dovetail lock face 64b into locking engagement with lock face 20d on slide 20, the pin and clamp subassembly 60, 62 is reinserted axially into groove 20b, and the pin 62 is rotated clockwise to bring eccentric portion 62c into camming and wedging coaction with cam face 20c to move wedge portion 60d into firm locking engagement with dovetail 64 and rigidly secure the jaws to the slide member.

The clamp 60 carries the cam-lock 62 only because holder 20 has no vertical structure corresponding to the lower portion 22b of holder 22. This is merely a matter of space limitation, but serves to show that the cam-lock function may be implemented in both direct and indirect-action ways. It will be apparent to those skilled in the mechanical arts that cam-lock 62 could be placed on holder 20 if desired.

It will be seen that the invention provides a means of replacing the jaw members of a tube clamping apparatus in a simple and very quick operation. Specifically, the jaw members may be replaced by simply rotating a cam pin through a minor fraction of a revolution, axially withdrawing the cam pin and/or the cam pin and clamp subassembly, and removing the jaws from the slide members. The invention thus provides a means of replacing jaws very quickly with resultant savings in operating time and therefore significant savings in the operating cost of the die set. Further, the invention provides a means of rapidly changing the jaws of the die set while yet retaining the jaws in a firmly locked position relative to the slide members during normal use of the apparatus.

Whereas a preferred embodiment of the invention has been illustrated and described in detail, it will be apparent that various changes may be made in the disclosed embodiment without departing from the scope or spirit of the invention.

I claim:

1. Cut-off apparatus for stock having a longitudinal axis comprising:
   support means;
   at least one jaw holder disposed on said support means for movement in a direction transverse to said axis between a stock clamping position and a stock release position;
   at least one stock clamping jaw disposed on said holder for movement therewith, said jaw having a stock-contacting surface adapted to engage the stock when the holder is in the clamping position;
   said holder and said jaw having mating locator surfaces formed thereon and extending parallel to said axis which, when in mutual engagement, positively secure said jaw to said holder along axes transverse to said axis and locate said jaw for engagement with said stock in said clamping position; and
   an eccentric cam manually operable to urge said jaw and holder locator surfaces together.

2. An apparatus according to claim 1 wherein:
   said eccentric cam comprises a pin member mounted for rotation about an axis parallel to said longitudinal stock axis and having a circumferential wedging surface thereon eccentric with respect to the rotational axis of the pin member.

3. An apparatus according to claim 2 wherein:
   said holder member includes a horizontal mounting surface;
   said jaw being mounted on the mounting surface of the associated holder for movement on the holder mounting surface in said transverse direction; and
   said jaw is moved in said transverse direction relative to the associated holder upon rotation of the associated pin member.

4. An apparatus according to claim 3 wherein:
   said jaw locator surface comprises a lock face extending parallel to said longitudinal axis and skewed with respect to said transverse direction; and said holder locator surface includes a lock face extending parallel to and in confronting relation to said lock face on the associated jaw for interlocking coaction therewith upon movement of the jaw in said transverse direction upon rotation of the associated pin member.

5. An apparatus according to claim 4 wherein:
an axial groove is provided in the mounting surface of said holder;
said jaw includes an axial rib along its lower face positioned in said groove;
said lock face on said jaw member is defined along an axial edge of the axial rib thereof; and
said lock face on said holder is defined along an axial edge of the axial groove therein.

6. An apparatus according to claim 4 wherein:
said holder includes an inboard platform portion defining said horizontal mounting surface on the top face thereof and an outboard tower portion defining a side face extending upwardly from the outboard end of said platform portion;
said jaw mounted on said mounting surface of said holder defining an outboard face positioned in confronting, transversely spaced relation to said side face of said holder tower portion;
said cam face is defined on said outboard face; and
the respective pin member is positioned between said jaw member outboard face and said holder member side face with said wedging surface thereof wedgingly engaging said cam face on the jaw member so as to urge the jaw member transversely inboard in response to rotation of said pin member.

7. An apparatus according to claim 6 wherein:
an axially extending inboard opening journal surface is provided in said side face of said holder; and
said pin member is journalled in said journal surface.

8. An apparatus according to claim 4 further including:
a second jaw holder;
one of said holders including an axial groove opening in said mounting surface thereof;
the jaw member mounted on said one holder including an axially extending rib defining said jaw member lock face along the outboard axial edge thereof;
an axially extending clamp member is positioned in said axial groove and includes an axially extending lock face along its upper inboard edge and an axially extending journal surface opening adjacent the outboard edge surface of said groove;
said outboard edge surface of said groove defines said cam surface; and
the respective pin member is journalled in said journal surface of said clamp member with its circumferential wedging surface wedgingly engaging said cam surface to urge said clamp member inboard in response to rotation of said pin member and move said clamp member lock face into locking engagement with said jaw member lock face.

9. An apparatus according to claim 8 wherein:
said rib has a dovetail configuration and defines a further lock face along the outboard axial edges thereof;
said one holder defines a further axially extending lock face proximate the inboard end of said mounting surface; and
said outboard lock face on said rib is moved into locking engagement with said further lock face on said holder member in respone to rotation of said pin member.

10. An apparatus according to claim 3 wherein:
said jaw locator surface comprises a lock face extending parallel to said longitudinal axis and skewed with respect to said tranverse direction; and
said holder locator surface includes a lock face extending parallel to and in confronting relation to said lock face on the associated jaw for interlocking coaction therewith upon movement of the jaw in said transverse direction upon rotation of the associated pin member.

11. An apparatus according to claim 10 wherein:
said holder includes an inboard platform portion defining said horizontal mounting surface on the top face thereof and an outboard tower portion defining a side face extending upwardly from the outboard end of said platform portion;
said jaw mounted on said mounting surface of said holder defining an outboard face positioned in confronting, transversely spaced relation to said side face of said holder tower portion;
said cam face is defined on said outboard face; and
the respective pin member is positioned between said jaw member outboard face and said holder member side face with said wedging surface thereof wedgingly engaging said cam face on the jaw member so as to urge the jaw member transversely inboard in response to rotation of said pin member.

12. An apparatus according to claim 11 wherein:
an axially extending inboard opening journal surface is provided in said side face of said holder; and
said pin member is journalled in said journal surface.

13. An apparatus according to claim 10 further including:
a second jaw holder;
one of said holders including an axial groove opening in said mounting surface thereof;
the jaw member mounted on said one holder including an axially extending rib defining said jaw member lock face along the outboard axial edge thereof;
an axially extending clamp member is positioned in said axial groove and includes an axially extending lock face along its upper inboard edge and an axially extending journal surface opening adjacent the outboard edge surface of said groove;
said outboard edge surface of said groove defines said cam surface; and
the respective pin member is journalled in said journal surface of said clamp member with its circumferential wedging surface wedgingly engaging said cam surface to urge said clamp member inboard in response to rotation of said pin member and move said clamp member lock face into locking engagement with said jaw member lock face.

14. An apparatus according to claim 13 wherein:
said rib has a dovetail configuration and defines a further lock face along the outboard axial edge thereof;
said one holder defines a further axially extending lock face proximate the inboard end of said mounting surface; and
said outboard lock face on said rib is moved into locking engagement with said further lock face on said holder member in response to rotation of said pin member.

15. An apparatus according to claim 10 wherein:

an axial groove is provided in the mounting surface of said holder;

said jaw includes an axial rib along its lower face positioned in said groove;

said lock face on said jaw member is defined along an axial edge of the axial rib thereof; and said lock face on said holder is defined along an axial edge of the axial groove therein.

16. A cut-off apparatus for stock such as tubing having a longitudinal axis comprising:

a support platen;

at least one jaw holder slideably mounted on the platen for movement toward and away from said axis;

a stock clamping jaw for disposition on said holder;

said holder having contiguous and angularly intersecting support and locator surfaces formed thereon and extending parallel to said axis;

said jaw having contiguous and angularly intersecting support and locator surfaces formed thereon for mating engagement with said support and locator surfaces of said holder, said surfaces in combination serving to place the jaw in a desired spatial relationship with said holder when said surfaces are fully engaged and secure said jaw to said holder against movement in all directions except parallel to said axis;

means for positively urging the locator surfaces together and for securing said jaw against movement relative to said holder along said axis.

17. An apparatus according to claim 16, wherein said manually operable means comprises an eccentric cam.

18. An apparatus according to claim 17 wherein:

said holder member includes a horizontal mounting surface;

said jaw being mounted on the mounting surface of the associated holder for movement on the holder mounting surface in said transverse direction; and said jaw is moved in said transverse direction relative to the associated holder upon rotation of the associated pin member.

19. An apparatus according to claim 17 wherein:

said eccentric cam comprises a pin member mounted for rotation about a rotational axis parallel to said longitudinal axis and having a circumferential wedging surface thereon eccentric with respect to the rotational axis of the pin member.

20. Cut-off apparatus for stock having a longitudinal axis comprising:

support means;

at least one jaw holder disposed on said support means for movement in a direction transverse to said axis between a stock clamping position and a stock release position;

at least one stock clamping jaw disposed on said holder for movement therewith, said jaw having a stock-contacting surface adapted to engage the stock when the holder is in the clamping position;

said holder and said jaw having mating locator surfaces formed thereon and extending parallel to said axis which, when in mutual engagement, positively secure said jaw to said holder along axes transverse to said axis and locate said jaw for engagement with said stock in said clamping position; and means manually operable to urge said jaw and holder locator surfaces together.

* * * * *